June 11, 1968   H. L. NEILSEN   3,387,520
PERFORATING DEVICE WITH SHEET CENTERING GAUGE MEANS
Filed Aug 26, 1966   3 Sheets-Sheet 2
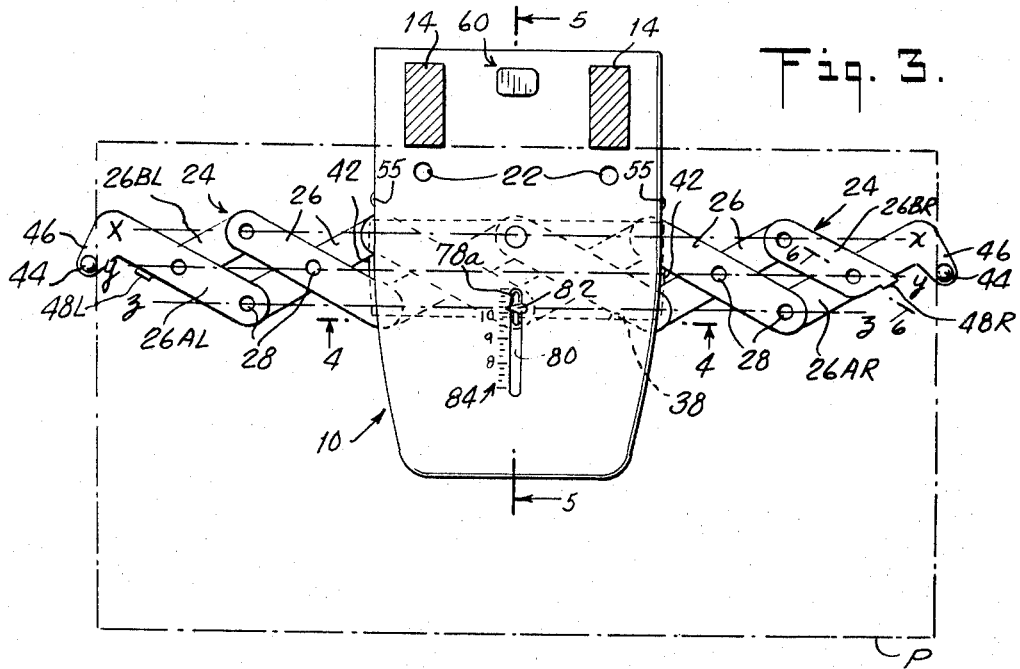
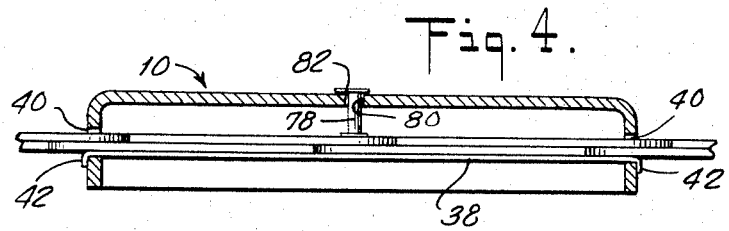
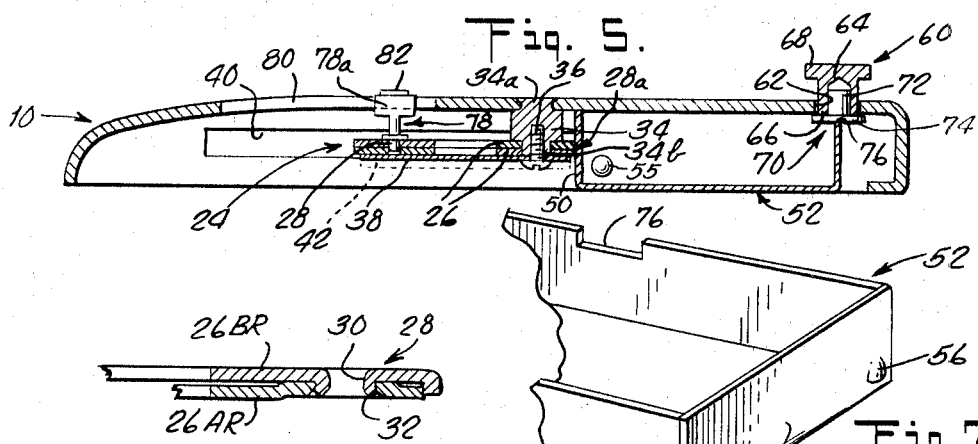
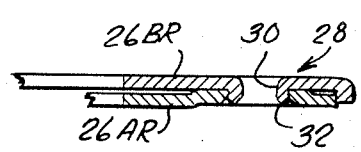
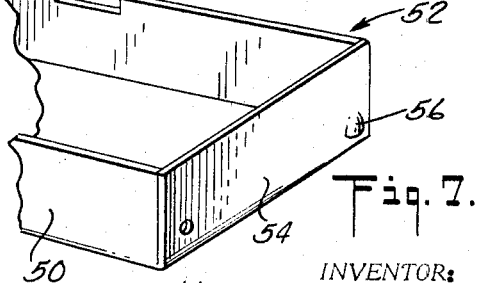
INVENTOR:
HILDAUR L. NEILSEN
BY
Robert Henderson
ATTORNEY

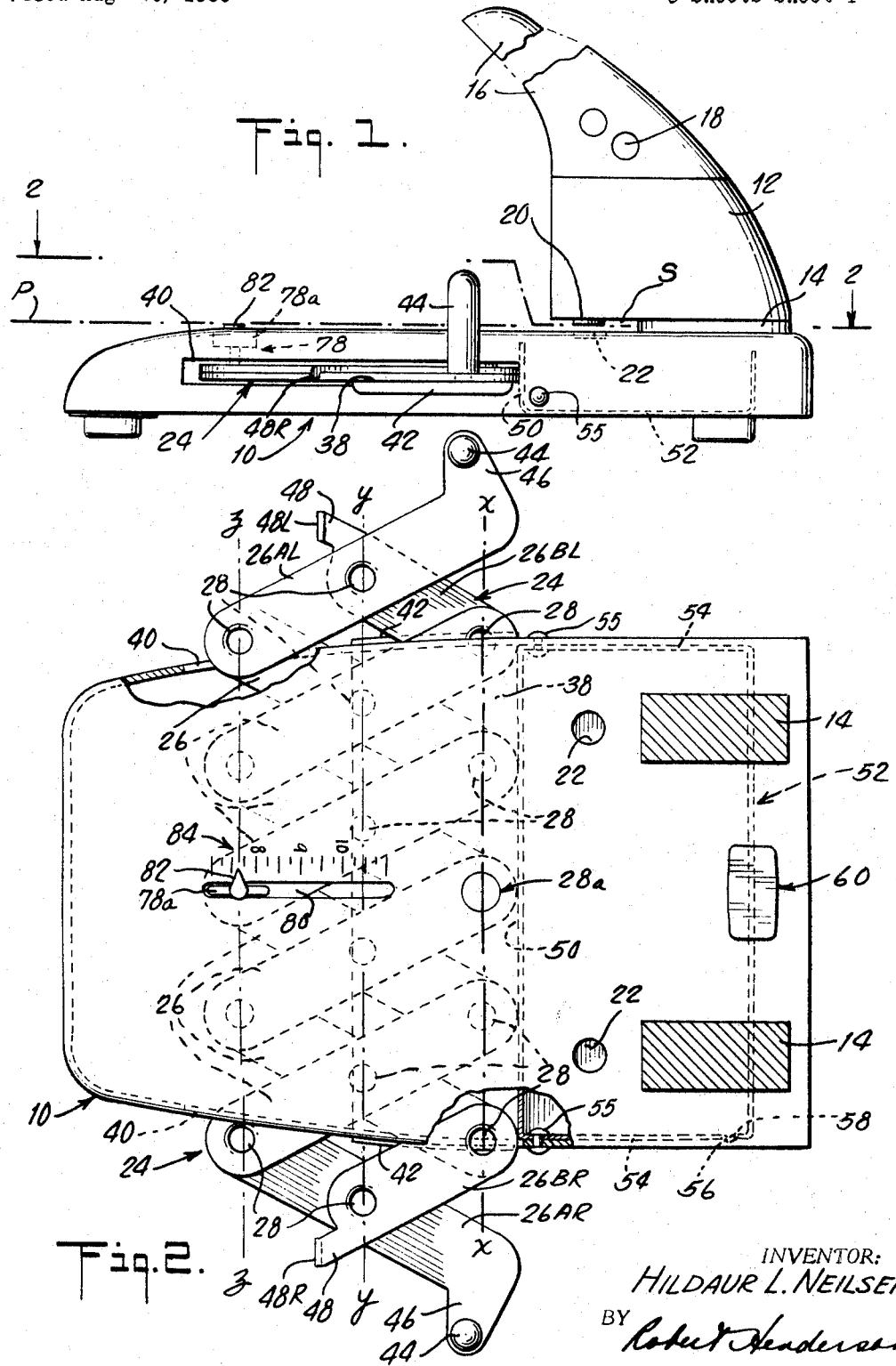

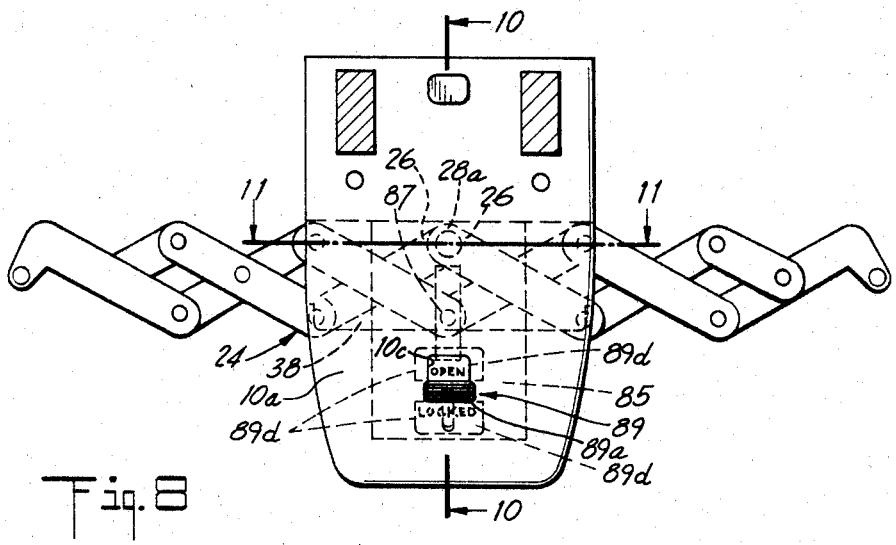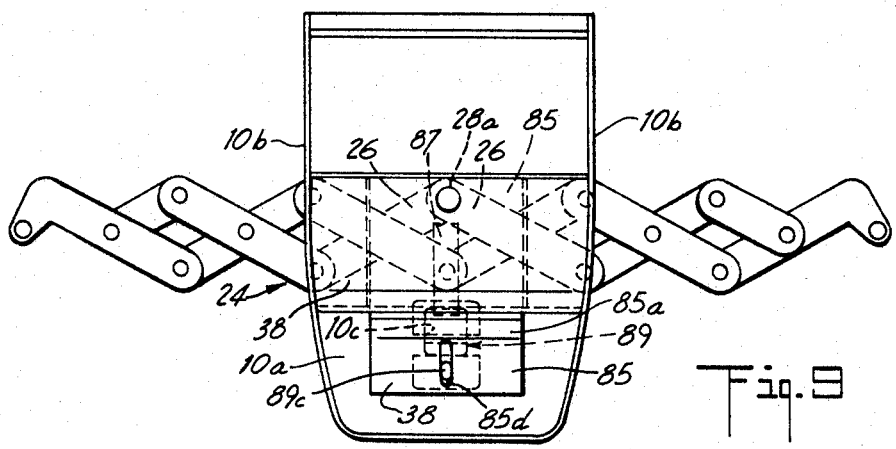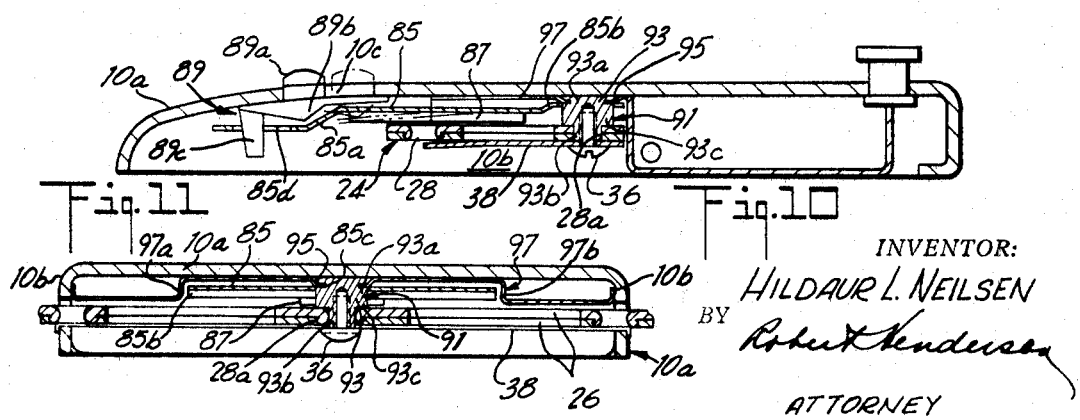

United States Patent Office 3,387,520
Patented June 11, 1968

3,387,520
PERFORATING DEVICE WITH SHEET
CENTERING GAUGE MEANS
Hildaur L. Neilsen, 2 Juniper St.,
Metuchen, N.J. 08840
Filed Aug. 26, 1966, Ser. No. 575,273
14 Claims. (Cl. 83—167)

This invention relates to devices quite commonly known as "paper punches" for punching holes in paper or other sheet material and, more particularly, is directed to gauge means associated with such devices for centrally locating a sheet with reference to hole-cutting plungers in the device. The use herein of the term "paper" is intended to comprehend not only paper, but also any other sheet material which may conveniently be centered by the gauge means in such a device.

An important object of this invention is the provision of such centering means in which opposed gauge members are always equidistant from a center line of the device irrespective of adjustments thereof to different sizes of paper.

Another important object is the provision of such centering means which are readily adjustable to different sizes of paper by manipulation of gauge members at either side of the device or at both sides thereof.

Another important object is the provision of a paper punching device which includes a pivotable receptacle for waste punchings of paper and wherein a wall of said receptacle serves as guiding means for the paper centering means.

Another important object is the provision of such paper centering means with indicia means, variable in response to adjustment of the centering means, for indicating at all times the spacing between gauge members at opposite sides of the device.

Another important object is the provision of such paper centering means having readily operable means for holding or locking the centering means in any one of various adjustments in which it may be set to accommodate various sizes of paper for centering purposes.

The foregoing and, perhaps, other objects and advantages are achieved by the present invention of which one of various possible embodiments is shown in the accompanying drawing without, however, limiting the invention to that particular embodiment.

In the drawing:

FIG. 1 is a side elevational view of a preferred form of device embodying this invention.

FIG. 2 is a horizontal sectional view substantially on the line 2—2 of FIG. 1, a portion being partly broken away for clarification.

FIG. 3 is a reduced top plan view, somewhat like FIG. 2, but showing paper gauging means extended to center a sheet of paper which is indicated in chain lines.

FIGS. 4 and 5 are vertical sectional views, drawn to the same scale as FIGS. 1 and 2, the sections, respectively, being substantially at the lines 4—4 and 5—5 of FIG. 3.

FIG. 6 is an enlarged vertical sectional view substantially at the line 6—6 of FIG. 3.

FIG. 7 is a perspective view of one end of a waste punching receptacle employed in the device.

FIG. 8 is a top plan view, somewhat like FIG. 3, but illustrating a modification which includes holding or locking means for retaining the paper gauging means in any one of various adjustments in which it may be set to accommodate various sizes of paper for centering purposes.

FIG. 9 is a bottom plan view of the modified device of FIG. 8.

FIG. 10 is a vertical sectional view, substantially on the line 10—10 of FIG. 8.

FIG. 11 is a vertical sectional view, substantially on the line 11—11 of FIG. 8.

First referring principally to FIG. 1, the perforating device includes a base 10, a punch housing 12, rigidly fixed upon the base adjacent to the back of the latter and spaced therefrom by intervening spacing pieces 14, and an operating handle or lever 16 mounted upon the housing 12, and movable angularly downwardly, manually about horizontally aligned pivot pins 18 (only one being shown) to operate a cam mechanism (not shown) within the housing 12 for pushing downwardly two punching plungers 20 (only one being shown) to cause the latter to coact with two holes 22 in the base 10 to punch paper held in the space S provided by the interposition of the spacing pieces 14 between the housing and the base.

As the upper portions of the device, appearing above the line 2—2 in FIG. 1, are of a conventional character well known to those familiar with this art and have no direct bearing on the present invention, said upper portions are omitted from the remainder of the drawing and, as indicated in the next preceding paragraph hereof, are shown only to such an extent as to permit an understanding of this invention.

The sheet centering means of this invention may best be understood from FIGS. 2 and 3 as comprising a lazy tongs assembly 24 formed of plural flat metal strips 26, 26AL, 26BL, 26AR and 26BR pivotally interconnected at plural points 28 and at one central point 28a in crisscrossed interrelation along parallel lines x—x, y—y, and z—z shown in FIGS. 2 and 3. The pivot points along line x—x are hereinafter referred to as rearward pivot points, those along line y—y are referred to as intermediate pivot points, and those along line z—z are referred to as forward pivot points.

The pivot connections at points 28 are all alike, one of which is shown in FIG. 6, as being formed by a circular punching in metal strip 26BR circularly flanged downwardly and outwardly as at 30 to engage accurately and pivotally within a hole 32 punched in metal strip 26AR.

The pivot connection 28a is the central rearward connection along the line x—x of FIG. 2. As best shown in FIG. 5, it comprises a mounting block 34, the upper end 34a of which is riveted into an accommodating hole in the top of the base 10, and a bottom cylindrical portion 34b of which extends, as a pivot stud, within aligned holes of two of the strips 26 which are interconnected at that point.

A headed short screw or stud 36 extends upwardly through a tongs-support plate 38 underlying the lazy tongs assembly 24, and, thence, is threaded or press fitted into the lower end of the mounting block 34 to complete the pivot interconnection 28a.

The support plate 38 extends transversely of the base 10, its opposite ends extending through slots 40 in opposite side walls of the base and being flanged downwardly, as at 42, intimately against the outer faces of said side walls. Thus, the plate 38 extends beneath and in supporting contact with a substantial area of the lazy tongs assembly 24.

The slots 40 are of such length and width as to freely accommodate portions of the lazy tongs assembly which project therethrough at opposite sides of the base when said assembly is in its fully contracted position.

Upright gauge members in the form of pins 44 are provided, in transverse alignment, upon outwardly extending projections 46, reduced lower ends of the pins being suitably riveted within suitable holes in said projections.

The metal strips 26BL and 26BR are shorter than the other metal strips and are provided at their outer ends with extensions 48 having, respectively, an upwardly extending flange 48L and a downwardly extending flange 48R for engaging adjacent side edges of metal strips 26AL and 26AR to limit the degree of permissible extension of the lazy tongs.

The lazy tongs assembly 24 as a whole is held against material turning movement about its central pivot interconnection 28a by sliding engagement of the rear ends of metal strips 26, 26BL, and 26BR with the front wall 50 of a pivotable waste tray 52 disposed within the base 10, immediately rearwardly of the lazy tongs assembly, as hereinafter more fully explained. The rear ends of said metal strips are semi-circularly rounded concentrically to the centers of the pivotal interconnections 28, 28a so that the mentioned sliding engagement is maintained at all times irrespective of the extended or contracted condition of the lazy tongs assembly.

The waste tray 52 is of such dimension transversely of the base 10 that its opposite side walls 54 engage the inner faces of adjacent side walls of the base with a sliding fit; and, at the walls 54, the tray is pivotally connected to the side walls of the base by pivot rivets 55.

A pressed-out protuberance 56 (FIGS. 2 and 7) formed in one wall 54 may either tightly engage a flat inner surface of the adjacent side wall of the base 10 frictionally or, as indicated in FIG. 2, may tightly engage frictionally within a shallow inner recess 58 formed in said side wall.

To enable the waste tray 52 to be pivoted downwardly for emptying, a push-button 60 is provided within a hole 62 in the top wall and toward the rear of the base 10. The push-button is freely slidable vertically within said hole and is of two piece construction to facilitate assembly. As illustrated in FIG. 5, an upper button member 64 has a lower, cylindrical portion 66 which fits slidably within the hole 62, and has an upper, pressing head 68 of greater diameter than said hole.

A lower button member 70 has an upper, stud portion 72, press fitted into the cylindrical portion 66, and a bottom, pressing foot 74, seated within a notch 76 formed in the rear wall of the tray 52. When the tray is in waste receiving position in the device, the pressing foot 74, as may be understood from FIG. 5, substantially closes the notch 76 to prevent escape of waste material from the tray.

By downward pressing of the push button 60, the rear part of the tray 52 is forced downwardly despite the frictional engagement of the protuberance 56 with the base; and, when said protuberance clears the bottom of the base, the tray freely swings downwardly and forwardly to an open position for emptying. While the tray is thus in open position, the push button 60 is held against separation from the device by its pressing head 68 and its pressing foot 74, neither of which can pass through the hole 62. After emptying, the tray 52 is easily swung back and pushed forcibly upwardly into its waste receiving position in the device as it appears in the drawing.

The paper-gauge means of the device, as thus far described, are operable as follows. To adjust the device for punching centered holes in any of plural given sizes of paper within or to the largest size which the device may accommodate, a single piece P (or several such pieces) of the paper is placed in the device with one of its edges backed against the two spacing pieces 14 as shown in FIGS. 1 and 3; the lazy tongs assembly 24, first, having been extended to their extension limit. Then, by manipulating the assembly 24 from either or both ends thereof by using the gauge pins 44 as handles, the lazy tongs assembly is contracted until one of said pins engages one side edge of the sheet and, with continued contraction of the lazy tongs assembly, the sheet of paper is pushed sidewisely by said one pin until the opposite side edge of the sheet engages the other pin.

After adjustment of the lazy tongs assembly as just explained, the device is in condition for punching a centered hole or plurality of holes in paper of the size to which said adjustment is made. The interconnections 28 are tight enough that the lazy tongs assembly normally remains in any given adjusted condition until manually changed rather forcibly. In practice, a paper punch often is employed almost exclusively with some particular size of paper and, hence, seldom requires adjustment of the paper centering means; but, as already indicated, readjustment is easily and quickly accomplished.

The described paper gauging or centering means lends itself to the provision of indicia means enabling a user to adjust said means for centering or gauging purposes without resorting to the use of one or more sheets of paper as hereinbefore explained. Such indicia means are illustrated as comprising a rigid upright stem 78 mounted, at its lower end, within the central pivot interconnection 28 of those at the line z—z. The stem 78 extends upwardly through a slot 80 in the top of the base 10 and has a pointer 82 rigidly fixed upon its upper end, pointing sidewisely to serve as an indicating member with reference to indicia 84 applied, adjacent to the slot 80, upon the top of the base 10.

During adjustment of the assembly 24 for centering of different sizes of paper, the stem 78 and its pointer 82 slide rearwardly in and above the slot 80 when the assembly 24 is being extended and slide forwardly when the assembly 24 is being contracted. By including suitable numerals, such as e.g. the figures 8, 9, 10, in the indicia 84 as shown in FIGS. 2 and 3, the user may, by reference to said pointer and indicia, observe the width of paper for which the assembly 24 is adjusted.

The mounting of the lower end of the stem 78 within its related pivot interconnection 28, best shown in FIG. 5, should involve a close fit within such interconnection; but the fit should not be tight enough to constrain the stem to turn with an adjacent metal strip 26 as a result of the limited angular movement pursued by the latter during expansion and contraction of the metal strip. To keep the pointer 82 at all times pointing sidewisely to the indicia 84 and right-angularly with reference to the slot 80, the stem 78, at least at its upper end 78a at the level of said slot, is of oblong shape in cross-section with its minor diameter a close sliding fit within said slot.

In the modified device of FIGS. 8–11, the pointer and indicia arrangement, 78, 82, 84 of the first described embodiment, is omitted, and holding or locking means are provided to hold the lazy tongs assembly 24 in any position to which it is adjusted. This gives more latitude to the degree of tightness needed in the interconnections 28 shown in the first described embodiment.

The principal parts of the locking means are a resilient locking plate 85 overlying the lazy tongs assembly 24, a friction pad 87 fixed to the underside of said plate, and a slidable operating button 89 coacting with a cam portion 85a located toward the front end of said plate to flex the latter downwardly to cause the pad to press tightly down upon an underlying portion of the lazy tongs assembly, thereby strongly opposing departure of said assembly from any adjusted position.

The locking plate 85, of somewhat resilient sheet steel, is oblong, and is held in position overlying the lazy tongs assembly 24 chiefly by a stud assembly 91 which is substituted for the central pivot connection 28a, shown in FIG. 5. The stud assembly 91, best shown in FIGS. 10 and 11, includes a pivot pin 93 having a relatively thick mounting portion 93a, and an adjoining, somewhat thinner stud portion 93b. The pivot pin's mounting portion 93a is riveted, at its upper end, into a rivet hole in a depression 95 of a rectangular sheet metal mounting plate 97 which is press-fitted tightly or otherwise fixedly secured between side walls 10b of base 10a of the device; this arrangement avoiding the presence of an unsightly rivet head at the top surface of the base 10a.

An offset back end 85b of the locking plate 85 is formed with an aperture 85c through which the pivot pin's thick mounting portion extends to position the back end of said plate. The mounting plate 97, as best shown in FIG. 11, is channeled at opposite sides thereof and inner side walls 97a and 97b of the channels are in abutting relation to side edges of the locking plate 85 to oppose material angular movement of the latter horizontally about the stud assembly 91. Such angular movement is also opposed by an integral finger 89c of the operating button 89 which projects downwardly from the latter, into a slot 85d in the plate 85 and is of such size as to permit operational sliding of said button relatively to the latter plate as hereinafter explained.

The pivotal interconnection 28a between adjacent strips 26 of the lazy tongs assembly is disposed upon the stud portion 93b and is held against upward shift by a shoulder 93c adjoining the portions 93a and 93b of the pivot pin 93. The tong-support plate 38 is fastened to the bottom of the pivot pin 93 by screw 36 which extends through a suitable screw hole, in the plate 38, which is smaller than the diameter of the stud portion 93b; and the screw 36 is suitably threaded into said stud portion.

The operating button 89 is advantageously molded in one relatively rigid piece, of suitable plastic material. It is formed with a pusher member 89a which extends upwardly from a cam portion 89b, slidably through a slot or opening 10c formed in the top of base 10a. The top of the pusher member 89a is wider than the opening 10c with portions overlying areas of the top surface of the base 10a, to prevent the member 89a from dropping down through said opening; and wing portions 89d of the operating button underlie bottom surface areas of the base 10a to prevent the button 89 from becoming dislodged upwardly through the opening 10c.

When the button 89 is in its full line position of FIG. 10, the lazy tongs assembly is unlocked so that it is free for manual adjustment to conform it to the width of the paper to be punched. Manual sliding of the button 89 rearwardly in the opening 10c causes the button's cam portion 89b to engage and slide upwardly on cam portion 85a of the locking plate 85 thereby flexing the forward end of the latter downwardly to cause the friction pad 87 to tightly engage underlying portions of the lazy tongs assembly 24 and thereby hold said assembly in any position to which it has been adjusted. Subsequent manual sliding of the button 89, forwardly, permits the plate 85 to flex upwardly to release the lazy tongs assembly for further adjustment.

In the absence of manipulation, the relative shapes of the parts 85a and 89b suffice to retain the button 89 in its non-locking position, while the frictional engagement of the button 89 with the base 10a and with the locking plate 85 serve to hold the button 89 in its locking position. The top of the pusher member 89a is advantageously cross ridged or striated to facilitate its movement manually.

Excepting the plastic buttons 60 and 89, the described parts of the illustrated embodiments are preferably of steel or other suitable metal.

It will be realized that the novel features herein disclosed may be utilized without departing from the invention as set forth in the following claims.

I claim:
1. A device for perforating a sheet of paper adjacent to an edge thereof, comprising a base, paper-perforating means on said base, a lazy tongs assembly, pivotal mounting means located centrally of said assembly and pivotally interconnecting the latter and said base at a line extending centrally of said paper-perforating means, and gauge members at opposite ends of said lazy tongs, for engaging opposite edges of a sheet of paper placed therebetween to center the paper relatively to the paper-perforating means.

2. A device for perforating a sheet of paper adjacent to an edge thereof, comprising a base, paper punching means on said base, a lazy tongs assembly extensible and contractible equally at opposite sides of a central point thereof, a pivotal mounting connection at said central point interconnecting said assembly and said base at a point spaced from said paper punching means and at a line extending centrally of the latter means, and gauge members fixed to said assembly toward opposite ends thereof equidistantly from said pivotal mounting connection, for engaging opposite edges of a sheet of paper placed therebetween to center the paper relatively to the paper punching means.

3. A device according to claim 2, said punching means including spaced punching elements arranged to punch plural holes in a line substantially parallel to a line along which said lazy tongs assembly is extensible and contractible at opposite sides of said central point of said assembly.

4. A device according to claim 2, further including a waste receptacle disposed underneath said punching means in position to receive punched-out paper waste which drops from said punching means, said receptacle having a flat side coacting with said lazy tongs assembly to oppose angular movement of said assembly as a whole about said pivotal connection.

5. A device according to claim 4, said receptacle being pivotally carried within said base and frictionally held therewithin in waste receiving position; and the device further including tray release means carried by said base and being manually operable into coaction with said tray to push the latter toward open, waste-discharging position.

6. A device according to claim 5, said tray release means comprising a button slidable within a hole in said base, the button comprising two separable pieces, each having a shank portion, and a head larger than said hole, the shank portions of said two pieces being shaped and dimensioned for telescopic interfitting to facilitate assembling of said button within said hole with said heads at opposite sides of the hole.

7. A device according to claim 2, said lazy tongs assembly having a portion which is movable relatively to said mounting connection, in a line extending transversely of the line of extension and contraction of said assembly, in response to such extension and contraction, and the device further including a visual indicator mounted on said assembly at the latter's mentioned portion and indicating, by its position, the spacing between said gauge members.

8. A device according to claim 2, said lazy tongs assembly comprising plural, substantially similar, relatively rigid pieces, pivotal piece-connections toward opposite ends of said pieces interconnecting the latter in criss-crossed relationship with the latter connections toward corresponding ends of said pieces at one margin of the lazy tongs assembly continuously in alignment with each other along a line which is non-variable relatively to said mounting connection and with said piece-connections toward corresponding ends of said pieces at an opposite parallel margin of said assembly continuously in alignment with each other along a line which is variable relatively to said mounting connection in response to extension and contraction of said assembly, and the device further including a visible indicator, carried upon said assembly at the latter's said opposite margin and indicating, by its position, the spacing between said gauge members.

9. A device according to claim 2, further including a locking plate disposed in approximate face-to-face relationship to said lazy tongs assembly and locking means for pressing said locking plate into face-to-face engagement with said lazy tongs assembly and for maintaining the latter engagement to hold the lazy tongs assembly against material changing of its extended or contracted position.

10. A device according to claim 9, further including a friction pad fixed to the face of said locking plate which is nearest to said lazy tongs assembly to enhance the holding action of the locking plate relatively to said assembly.

11. A device accordng to claim 2, further including a support plate fixed to said base and supportably underlying said lazy tongs assembly, a holding plate overlying said assembly, and plate actuating and holding means coacting with said holding plate to press the latter downwardly upon said assembly to hold the latter against material changing of its extended or contracted position.

12. A device according to claim 11, said plate actuating and holding means comprising an upwardly facing cam surface on said holding plate, a manually operable camming button slidably carried by said base, above said holding plate, and having a downwardly facing cam surface thereon; said cam surfaces being inactive in a first position of said button and being so relatively shaped as to press the holding plate downwardly into holding engagement with said assembly during sliding of said button to a second position in which said holding engagement is maintained; and said device further including retaining means for retaining said button in said second position.

13. A device according to claim 12, said retaining means comprising portions of said button in functional, button retaining engagement with portions of said base and said holding plate.

14. A device according to claim 12, said holding plate being resilient and being flexed downwardly by said camming button when the latter is in said second position, and said holding plate, by the reaction of said flexed condition, maintaining such functional engagement with said button as to hold the latter in its said second position.

References Cited

UNITED STATES PATENTS

| | | | |
|---|---|---|---|
| 1,316,215 | 9/1919 | Amdursky et al. | 83—700 X |
| 1,956,443 | 4/1934 | Hertel | 83—421 X |
| 2,445,093 | 7/1948 | Von Cseh | 83—449 |
| 2,534,094 | 12/1950 | Yerkes | 83—449 |

FOREIGN PATENTS

| | | |
|---|---|---|
| 732,166 | 6/1932 | France. |
| 636,533 | 10/1936 | Germany. |

WILLIAM W. DYER, Jr., *Primary Examiner.*

F. T. YOST, *Assistant Examiner.*